(12) United States Patent
Howard (10) Patent No.: US 6,422,582 B1
(45) Date of Patent: Jul. 23, 2002

(54) CENTER HOLDING ASSEMBLY FOR VEHICLE STEERING SYSTEMS

(76) Inventor: Durrell U. Howard, 306 Krameria Dr., San Antonio, TX (US) 78213

( * ) Notice: Subject to any disclaimer, the term of this patent is extended or adjusted under 35 U.S.C. 154(b) by 0 days.

(21) Appl. No.: 09/699,520

(22) Filed: Oct. 31, 2000

(51) Int. Cl.[7] .............................................. B62D 7/22
(52) U.S. Cl. ...................................................... 280/90
(58) Field of Search ............................... 280/90, 89.11, 280/89, 89.13, 268

(56) References Cited

U.S. PATENT DOCUMENTS 6,267,395 B1 * 7/2001 Howard .................... 280/89.11
6,272,947 B1 * 8/2001 Howard ....................... 280/90

* cited by examiner

Primary Examiner—Paul N. Dickson
(74) Attorney, Agent, or Firm—Nexsen Pruet Jacobs & Pollard, LLC; Townsend M Belser, Jr.

(57) ABSTRACT

A linkage assembly of variable length extends between a steerable member and a frame member to define the center position of the steerable member. The linkage assembly includes a resistance assembly for providing a resistance force resisting forces tending to move the steerable member to either side of the center position, and a center holding assembly having a piston that may be locked in position in a cylinder for transmitting steering forces to the resistance assembly. A control valve is operable between a closed position for preventing fluid flow so that the piston is held in its locked position, and an open position for allowing the holding piston to move away from its locked position to permit the length of the linkage to freely change in response to the steering forces. The control valve is operated by an actuator responsive to the amount of the resistance force, such that the piston is free to move in its cylinder when the resistance force exceeds a predetermined amount.

10 Claims, 3 Drawing Sheets

FIG. 5

CENTER HOLDING ASSEMBLY FOR VEHICLE STEERING SYSTEMS

FIELD OF THE INVENTION

This invention relates to vehicle steering systems and more particularly to a device for holding the steerable wheels of a vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist normal steering inputs away from center, including those of the driver. Intentional turning maneuvers by the driver therefore require sufficient turning force to overcome this positive resistance to movement away from center. When the driver relaxes the turning force applied to the steering wheel, a positive caster system has a definite tendency to return to its straight ahead position, although it may overshoot the neutral or center position if the steering wheel is entirely released.

While positive caster is desirable in some respects, it is not without compromises over the full steering spectrum. For example, the adverse effects of strong gusty cross winds are usually more pronounced with large amounts of positive caster. As its name would imply, the vehicle tends to caster towards the side of the roadway to which it is being pushed by the wind. Similarly, a high crown at the center of the roadway or a slanted roadway can cause vehicles to turn toward the edge of the roadway, that is, in the downhill direction. In addition, generous positive caster provides significant resistance to small radius turns, which can make city driving quite fatiguing. These three adverse effects are some of the negative aspects of achieving steering stability through generous amounts of positive caster.

Another drawback of prior art steering systems is that spurious inputs transmitted from the roadway through the steerable wheels affect substantially the entire steering assembly before encountering any stabilizing resistance from the steering wheel. The negative action of the steerable wheels is caused by spurious steering inputs from crosswinds, slanted or crown roads, bad road surfaces, and other adverse dynamic steering forces. Inherent geometric steering characteristics may also be responsible for spurious steering inputs.

The transmission of these various inputs between the steerable wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center holding of the steerable wheels, and significantly reduces driver fatigue because it results in a major reduction in driver steering inputs. The holding assembly is easily activated by the driver while driving the vehicle, and its activation makes driving more pleasurable and less fatiguing.

The center holding assembly of the invention comprises linkage means of variable length that extends between the steerable wheels and an axle or frame member such that the length of the linkage means defines the center position of the steering system. The linkage means comprises a resistance assembly that provides a resistance force for resisting steering forces tending to move the steerable wheels to either side of the center position, and a center holding assembly for transmitting the steering forces to the resistance assembly.

The holding assembly comprises a holding piston, a holding cylinder providing first and second holding chambers, one on each side of the holding piston, a fluid transfer system for providing a flow of fluid to and from each of the holding chambers, and a solenoid operated valve for controlling the fluid flow. The control valve is operable between a closed position for preventing the fluid flow to hold the piston in a locked center position, and an open position for allowing the piston to move away from its center position in the holding cylinder. Movement of the holding piston causes fluid flow to one of the holding chambers and fluid flow from the other of the holding chambers. This fluid flow permits the length of the linkage assembly to change relatively freely in response to steering forces, which in turn permits the steerable wheels to move freely to either side of their center position in response to applied steering forces for small radius turns as used for going around corners in city driving.

The resistance force provided by the resistance assembly is preferably produced either by a dual spring mechanism or by a second fluid system comprising a pair of pistons in a cylinder, and an accumulator. An electrical actuator system is responsive to the resistance force for operating the solenoid control valve so as to prevent holding piston movement away from its locked center position until the resistance force reaches a predetermined level.

The actuator system includes a first sensor for providing a first signal in response to the predetermined resistance force, a second sensor for providing a second signal in response to the holding piston being in its locked position, and a control assembly. The control assembly causes the solenoid valve to move to its open position in response to the first signal and thereafter keeps the valve open during holding piston movement away from its locked position. The control assembly actuates the solenoid valve to its closed position only when the holding piston returns to its locked position after the vehicle has completed a small radius turn.

The resistance assembly includes a component that moves in response to the applied steering force, and movement of this component resists relatively small and limited changes in the length of the linkage assembly, such that relatively small movements of the steerable wheels to either side of their center position are opposed by the resistance force. These small movements correspond to the very large radius turns that occur when a vehicle is steered through maneuvers at highway speeds (as opposed to the small radius turns that occur when a vehicle turns a corner). Thus, during large radius turns, the resistance assembly provides a resistance force that biases the steerable wheels back toward their center position, and this bias serves as a return force to return the steerable wheels to their center position upon removal of the steering force producing the large radius turn.

On the other hand, during small radius turns, the resistance assembly is rendered ineffective (and may be said to be deactivated) by the control assembly causing opening of the solenoid valve, which in turn allows movement of the holding piston away from its locked position in response to the steering force applied to produce the small radius turn. A preferred way of "triggering" the opening of the solenoid valve is for the first sensor to provide its signal in response to a predetermined amount of the aforesaid resistance component movement that is proportional to the resistance force.

Once the solenoid valve is opened to allow movement of the holding piston away from its locked center position, this valve remains open until the piston returns to its center position so that no resistance force will be applied to the steering system during small radius turning maneuvers of the steerable wheels. In addition, the actuator system includes a remote switch for turning the actuator system on and off remotely from the driver's station of a vehicle. When the remote switch is in its off position, the solenoid valve remains open so that no resistance force is applied to the steering system by the linkage assembly because the holding piston is not "locked" and is therefore free to move away from its center position in the holding cylinder.

The assembly is preferably connected between the steering system and the front axle or a nearby frame member of the vehicle in a position that allows the steerable member(s) to move through its full range of steering movements while providing sufficient leverage for the apparatus to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the reduction gear. The frame connection may be made to any component serving as a fixed mounting relative to the steering system. This fixed component may be a frame member, or an axle or some other part carried by the vehicle frame instead of an actual frame member.

The invention may be used with steering systems having a reduction gear between the steering wheel and the steerable wheels. In this application, the assembly is preferably connected to the steering system at a location between the steerable wheels and the reduction gear so as to be unaffected by any slack in the reduction gear or in components and connections between the reduction gear and the steering wheel. It is therefore on the slow side of the reduction gear ratio. The invention thus provides a zero backlash center holding assembly.

An adjustment means accessible by a mechanic provides for different levels of steering force to initiate or breakaway into a steering movement away from center, depending on the size, type and steering characteristics of the vehicle. This level of force is sometimes referred to in this specification as the "break away resistance". Different levels of break away resistance and of resistance force may also be appropriate to compensate for changes in the forces acting upon the vehicle. Thus, the resistance force provided by the invention may be increased or decreased to provide a level of force sufficient to overcome any spurious steering inputs and to suit driver road feel, particularly a feel of the steering wheel that lets the driver know when the steered wheels are beginning to move away from center and are closely approaching return to center.

In the absence of the invention, spurious inputs to and/or mechanical slack in the steering assembly require almost constant manipulation of the steering wheel by the driver and make it almost impossible for the driver to hold the vehicle on a true straight ahead course. Use of the invention therefore permits a substantial reduction in the caster angle of vehicles with positive caster, thereby significantly reducing the crosswind effect and provides the driver with a positive touch control not heretofore attainable with positive caster.

In other words, the invention provides a distinctive feel when approaching or leaving the center position. Thus, the sense of touch is added to the visual sense to aid control of the vehicle and reduce driver fatigue. The turning resistance selected should satisfy the road feel desired by the driver and be sufficient to overcome anticipated spurious inputs. Positive stability is thereby achieved for previously unstable steering systems.

Although the present invention is particularly useful as a center holding assembly for motor vehicles, it can be employed to hold the center position of any steerable member moveable to either side of a preselected position. For example, the assembly can keep an outboard motor centered so that a boat follows a straight course over the water in the presence of spurious steering forces produced by wind and wave action. The assembly can also be used to keep centered such steerable members as the rudders of ships or airplanes and the tongues of tandem trailers or railway cars. The assembly is useable with both power and non-powered steering systems, with the level of holding forces provided usually being less for vehicles without power steering.

BRIEF DESCRIPTION OF THE DRAWINGS

The invention, both as to its structure and operation, may be further understood by reference to the detailed description below taken in conjunction with the accompanying drawings in which.

DETAILED DESCRIPTION OF THE INVENTION

Figures 1, 2, 6:
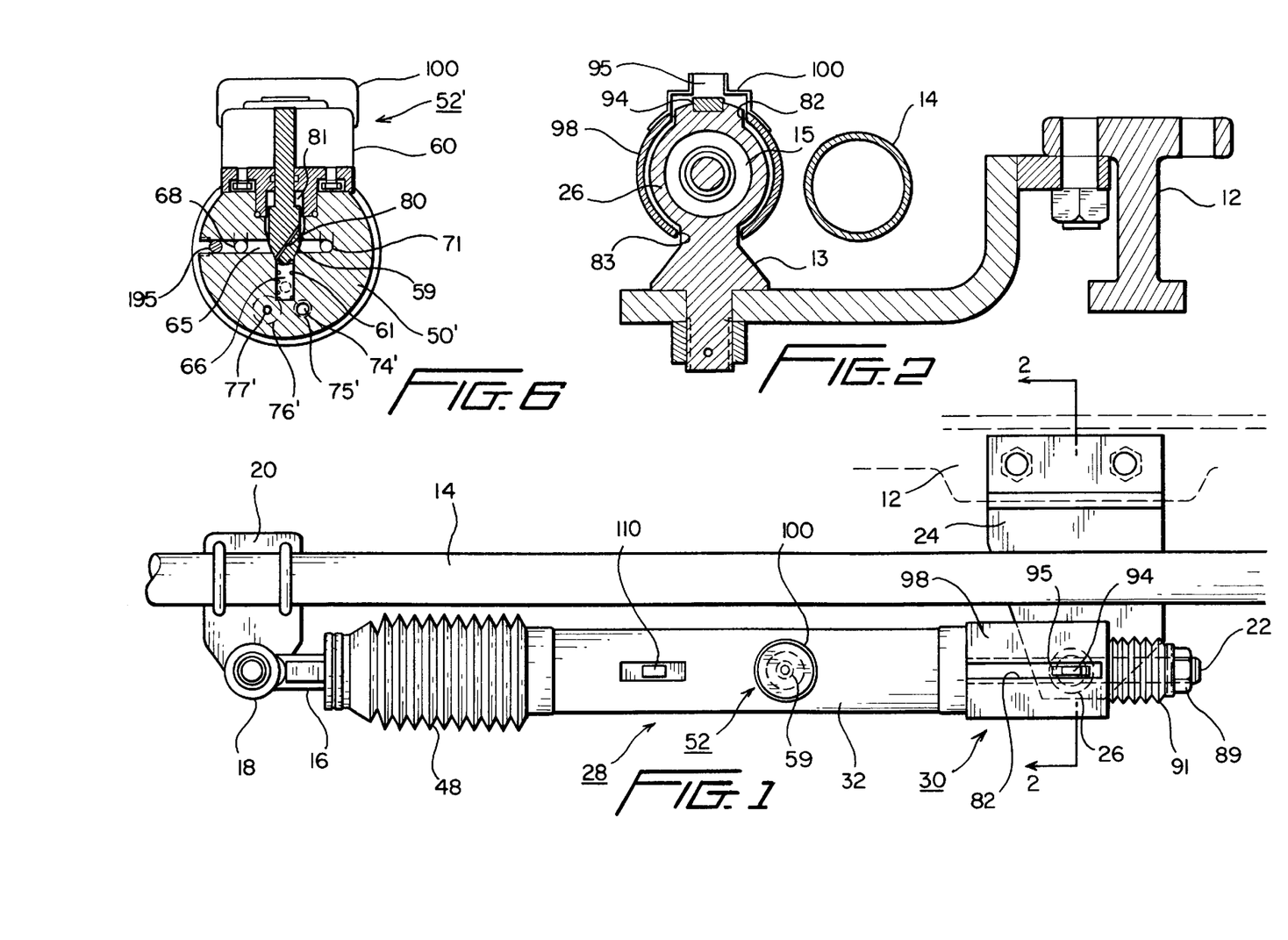
FIG. 1 is a plan view illustrating installation of the invention between the frame and steering system of a motor vehicle.
FIG. 2 is a sectional view taken along line 2—2 of FIG. 1 showing the structure connecting the turning resistance assembly to the vehicle frame.
FIG. 6 is an enlarged partial sectional view of the locking valve portion of the holding cylinder assembly taken along line 6—6 of FIG. 5.

The center holding system of the present invention comprises a linkage assembly, generally designated 10, which may be connected between a front axle or frame member 12 and the tie rod 14 of a conventional motor vehicle as shown in FIG. 1 of the drawings. Steering inputs by the driver are transmitted to the tie rod 14 by the pitman arm (not shown) of the vehicle's steering gear. The outer end of a holding rod 16 of linkage assembly 10 is connected to the tie rod 14 by means of a ball joint 18 connected between the outer rod end and tie rod 14 by a bracket 20.

Figures 3, 4:
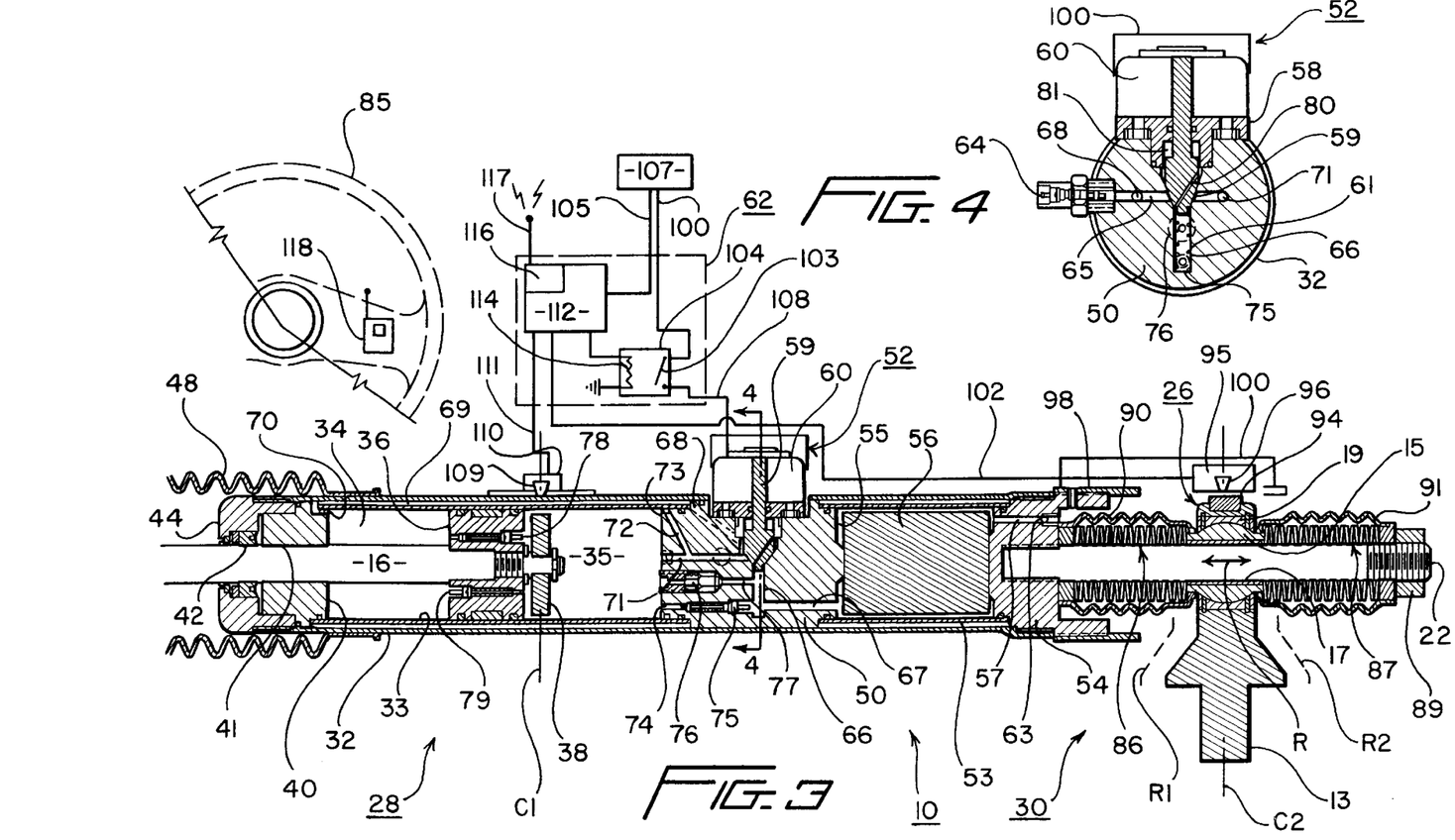
FIG. 3 is a schematic diagram of the fluid and electrical systems and of the major components of the invention, and includes sectional views showing structural details of the holding cylinder assembly and the turning resistance assembly.
FIG. 4 is an enlarged partial sectional view of the locking valve portion of the holding cylinder assembly taken along line 4—4 of FIG. 3.

The outer end of a resistance rod 22 at the opposite end of linkage assembly 10 is connected to the axle 12 by means of a mounting bracket 24 to which is secured a stub 13 carrying the ball element 15 of a ball joint 26 slidingly carried on a mid-portion of the resistance rod 22 by a sleeve 17 as shown in FIG. 3. The ball joints 18 and 26 permit pivotal movement in the vertical plane and to a limited extent in the horizontal plane, and are conventional joints wherein an enlarged spherical ball 15 is held for pivotable movement within a surrounding journal structure 19 carried by the stub.

The components of the holding system and the way in which they hold center at highway speeds, and return a vehicle steering system to center only from large radius turns at those speeds, will now be described. It is to be understood that the components described are connected together by appropriately sized fluid conduits and electrical wires and that these conduits and wires are represented by the lines interconnecting the components as shown in the drawings.

Referring now to FIGS. 3 and 4, the linkage 10 includes a holding assembly 28 and a resistance assembly 30. Holding assembly 28 comprises a holding cylinder housing 32 enclosing an interior cylinder 33, which is divided into two chambers 34 and 35 by a holding piston 36 secured to the inner end of holding rod 16. The inner end of rod 16 also carries a magnetic disk 38, the purpose of which will be described below. The outer ends of housing 32 and cylinder 33 are closed by a head 40 having a journaled and sealed aperture 41 for sliding passage of holding rod 16. A set of multiple seals 42 and the head 40 are secured in place by an end cap 44 threaded or crimped into the cylinder housing 32. The end portion of holding rod 16 projecting beyond cylinder housing 32 is surrounded by a dirt and grease barrier in the form of a flexible boot 48.

The inner end of cylinder 33 is closed by an intermediate head 50 in which is mounted an electrically operated solenoid valve 52, the purpose of which is also described below. The side of intermediate head 50 opposite to holding cylinder 33 closes a reservoir cylinder 53 that is also enclosed by the housing 32. The end of cylinder 53 opposite to head 50 is closed by an end head 54 to define a reservoir chamber 55 containing a resilient cylindrical pad 56 made of a foam plastic with closed cells, such that an increase in pressure caused by fluid flowing into chamber 55 will compress and thereby decrease the size of the pad 56. The closed cell foam material chosen for pad 56 is preferably selected such that the pad will be compressed by about 50% in response to a pressure of about 30 psig. In turn, such a pressure increase will be maintained by the resiliency of the pad 56 to cause an outflow of fluid from chamber 55 when an outflow path is provided as described below. The chamber 55 of cylinder 53 thereby serves as an accumulator for fluid discharged from holding chambers 34 and 35.

As may be seen best in FIG. 4, the solenoid valve 52 is secured to the intermediate head 50 by an adaptor 58 and has a tapered valve stem 59 that fits within a correspondingly tapered valve seat when the valve is actuated to its closed position by an electric current supplied to the solenoid 60 by an electrical switch assembly 62. In the absence of electrical power, valve stem 59 is pushed to its open position by a compressed return spring 61. When the valve 52 is in its open position (deactivated), a fluid, preferably a liquid, may be supplied to the holding chambers 34 and 35 and the reservoir chamber 55 via a Schraeder type pressure valve 64 communicating with reservoir chamber 55 via internal passages 65, 66, and 67; communicating with holding chamber 34 via internal passages 65 and 68 and an annular passage 69 between the housing 32 and the cylinder 33 leading to chamber port 70; and communicating with holding chamber 35 via internal passages 65, 71, and 72 leading to a chamber port 73. The chambers 34, 35, and 55 and their interconnecting passages are preferably filled with a liquid via valve 64, and for this liquid fill, a passage 57 in end head 54 connects reservoir chamber 55 to ambient via a bleed valve 63 for bleeding air from these chambers as they are filled with liquid.

When valve 52 is open, piston 36 is relatively free to move back and forth in holding chambers 34 and 35 away from a center position C1, in which piston 36 is "locked" when valve 52 is closed. The availability of an accumulator reservoir, such as reservoir 55, is required even though the fluid may flow back and forth between holding chambers 34 and 35 via ports 70 and 73 and interconnecting passages 69, 68, 71, and 72, when valve 52 is open. This is because of the volume of chamber 34 taken up by the presence of holding rod 16, which makes the volume change in chamber 34 by the movement of piston 36 different from the volume change in chamber 35 by such movement.

The reservoir 55 may also receive fluid discharged through internal passages 74 and 67 by a relief valve 75 for preventing an excessive positive pressure in chamber 35, which could unduly restrict steering system movement. A similar restriction of steering system movement that could be caused by a vacuum in chamber 35 is prevented by an excessive negative pressure relief valve 76 in an integral passage 77. Similarly, excessive positive pressure relief for holding chamber 34 is provided by a relief valve 78, and excessive negative pressure relief for chamber 34 is provided by a pressure relief valve 79, valves 78 and 79 being mounted in corresponding through passages in holding piston 36. To prevent the possibility of a pressure differential developing across valve stem 59 and interfering with its operation, the valve stem includes a diagonal passage 80 interconnecting the overlying stem retraction chamber 81 with the underlying central passage 66.

The reservoir end head 54 is connected to the frame bracket 24 by the resistance assembly 30, which includes the ball joint 26 comprising the bracket mounting stub 13, the ball member 15 and the annular journal member 19 for carrying and permitting articulation of the ball member 15. Mounted in the ball member 15 is the sleeve 17 for slidingly receiving the resistance rod 22 so that the ball joint may slide back and forth along the rod 22 in its axial directions.

An inner compression spring member 86 surrounding rod 22 is mounted between the ball 15 and the outer end face of the reservoir end head 54, and an outer compression spring member 87 surrounding rod 22 is mounted between ball 15 and a lock nut 89 threaded onto the distal end of rod 22. The spring members 86 and 87 are surrounded by dirt and grease barriers in the form of flexible boots 90 and 91, respectively. Although other types of compression spring members may be utilized, the members 86 and 87 are preferably made from a plurality of stacked Belleville spring washers. These are annular washers of spring steel that have a convex shape so as to form an accordion-like spring member when a plurality thereof are placed on the rod 22 with the convex side of adjacent washers facing in opposite directions.

When so arranged, the spring force of the spring members 86 and 87 oppose movement of the ball member 15 in either direction away from a center position represented by the centerline C2. The number and type of Belleville washers are preferably chosen to provide about ½ inch of movement of the ball joint to either side of the center position, this reciprocal movement being represented by the arrow R and the limits of this movement being represented by the pair of broken lines R1 and R2. Where the resistance rod 22 has a diameter of about ⅝ inches, about 22 Belleville washers may be used for each of the spring members 86 and 87.

Adjustment of the lock nut 89 in either of the axial directions along rod 22 allows adjustment of the initial compression preload applied by the spring members 86 and 87 when the ball joint is in its center position. A preload of about 200 lbs. to about 250 lbs. is preferred, and this amount of preload will compress each spring pack by about ½ of the distance that the spring pack may be compressed before all of the washers are flattened. With this preload, the maximum resistance force opposing turning movement away from center will be about 350 lbs to about 400 lbs., as measured at the tie rod.

At the top of the mounting stub 13 of ball joint 26 is a magnet 94 and, mounted in close proximity, is a centering limit switch 95 having a magnetic pickup or sensor 96 centered on the centerline C2. Switch 95 is activated by the movement of magnet 94 beyond the range of sensor 96, this range corresponding to the limit R1 as rod 22 moves to the right and to limit R2 as rod 22 moves to the left in FIG. 3. To ensure that magnet 94 is not moved out of sensor range by rotation of the bearing around the axis of rod 22, an anti-rotation member 98 is affixed to end head 54 and is in the form of a double-slotted tube in which an upper slot 82 is arranged to engage opposite sides of an upper portion of the bearing body and a lower slot 83 is arranged to engage a lower portion of the bearing body as shown in FIG. 2. The anti-rotation member 98 also provides a base on which the switch 95 is mounted by a bracket 100.

The operation of the holding assembly 28 and the resistance assembly 30 will now be described in more detail. When the steerable wheel or member of a vehicle is turned to either side of its center position, either by a steering force transmitted from the steering wheel 85 or other steerable member or by spurious steering forces transmitted to the steerable member by a roadway or the like, this steering movement is resisted by the resistance assembly 30 of the linkage assembly 10. Until the steering force exceeds the compression preload of the spring members 86 and 87, i.e., 200 lbs., for example, there will be no movement of the steerable member. After the compression preload is exceeded, small turning movements are permitted within the range between R1 and R2, such as for example up to a steering force of about 350 lbs. as applied to the tie rod 14. This maximum steering force is opposed by an equal amount of resistance force provided by the compression spring force, which biases the ball joint and the entire steering system backs toward their center positions. The small turning movements permitted are sufficient for maneuvering a motor vehicle at highway speeds, and the resistance force bias returns the steering system to center after such maneuvers, which also may be referred to as large radius turns.

At the maximum steering force limit, the body of stub 13 is either in the position R1 or the position R2 such that the magnet 94 has moved beyond the sensing range of sensor 96, thereby activating the switch 95. When activated, switch 95 sends an electrical signal via a wire 102 to a control unit 62. This signal causes the opening of a switch 103 in a relay 104 which interrupts electrical power provided to the solenoid 60 of valve 52 via electrical lines 105 and 106 from a power supply 107.

The loss of electrical power to solenoid 60 causes retraction of valve stem 59 into chamber 81 in response to return compression spring 61, thereby placing valve 52 in its open position. When valve 52 is in its open position, fluid is free to flow back and forth in the internal passages in intermediate head 50 as previously described. For example, the piston 36 is free to move toward the right in FIG. 2, thereby causing fluid to flow from holding chamber 35 into holding chamber 34 through passages 72, 71, 68, and 69, and into reservoir chamber 55 through passages 72, 71, 66, and 67. On the other hand, movement of piston 36 to the left in FIG. 2 causes fluid to flow from holding chamber 34 into holding chamber 35 via passages 69, 68, 71, and 72, and into reservoir chamber 55 via passages 69, 68, 66, and 67. However, in this instance, there may be relatively little or no flow into reservoir chamber 55 because the volume of chamber 35 will increase more rapidly than the volume of chamber 34 will decrease, due to the presence of holding rod 16 in chamber 34.

Although the piston 36 is relatively free to move back and forth in the chambers 34 and 35 when solenoid valve 52 is open, it is preferable that the internal passages in intermediate head 50 be sized to provide a dampening action sufficient to prevent overly rapid movements of the steerable member away from its center position, such as may otherwise occur during the blowout of a tire on a steerable wheel. The invention may thus provide a relatively high degree of protection against a loss of vehicle steering control due to tire blowouts or other accidental impacts to a steerable wheel.

After the solenoid valve 52 has been opened by a signal from switch 95, it will remain open until the magnet 38 on the inner end of holding rod 16 returns to its center position C1 beneath a magnetic pick-up or sensor 109 of a center position switch 110. When the magnet 38 is centered at the position C1, the switch 110 provides a signal to the receiver 112 via electrical line 111. At this time, the earlier signal provided to the receiver 112 by switch 95 has ceased because the magnet 94 immediately returns to center on the centerline C2 under the action of spring member 86 or 87 upon the opening of valve 52. Upon receiving a signal from switch 110 without a signal from switch 95, the receiver 112 provides a current to coil 114 in relay 104 and thereby closes relay switch 103 of control unit 62, which in turn closes valve 52 by feeding current via line 108.

The control unit 62 optionally may also include a remote receiver section 116 for receiving a remote signal inputted to an antenna 117 from a remote signal generating unit 118 that may be located on the steering wheel 85 or elsewhere within the driver's station of a motor vehicle using the invention for centering the vehicle's front steerable wheels. The signal generating unit 118 and the signal receiving section 116 are of conventional design and allow the driver of the vehicle to turn the system on and off as desired. With this option, the switch 103 of relay 104 cannot be closed until the receiver section 116 receives an ON signal from the remote unit 118. Similarly, an OFF signal from unit 118 opens switch 103.

Figure 5:
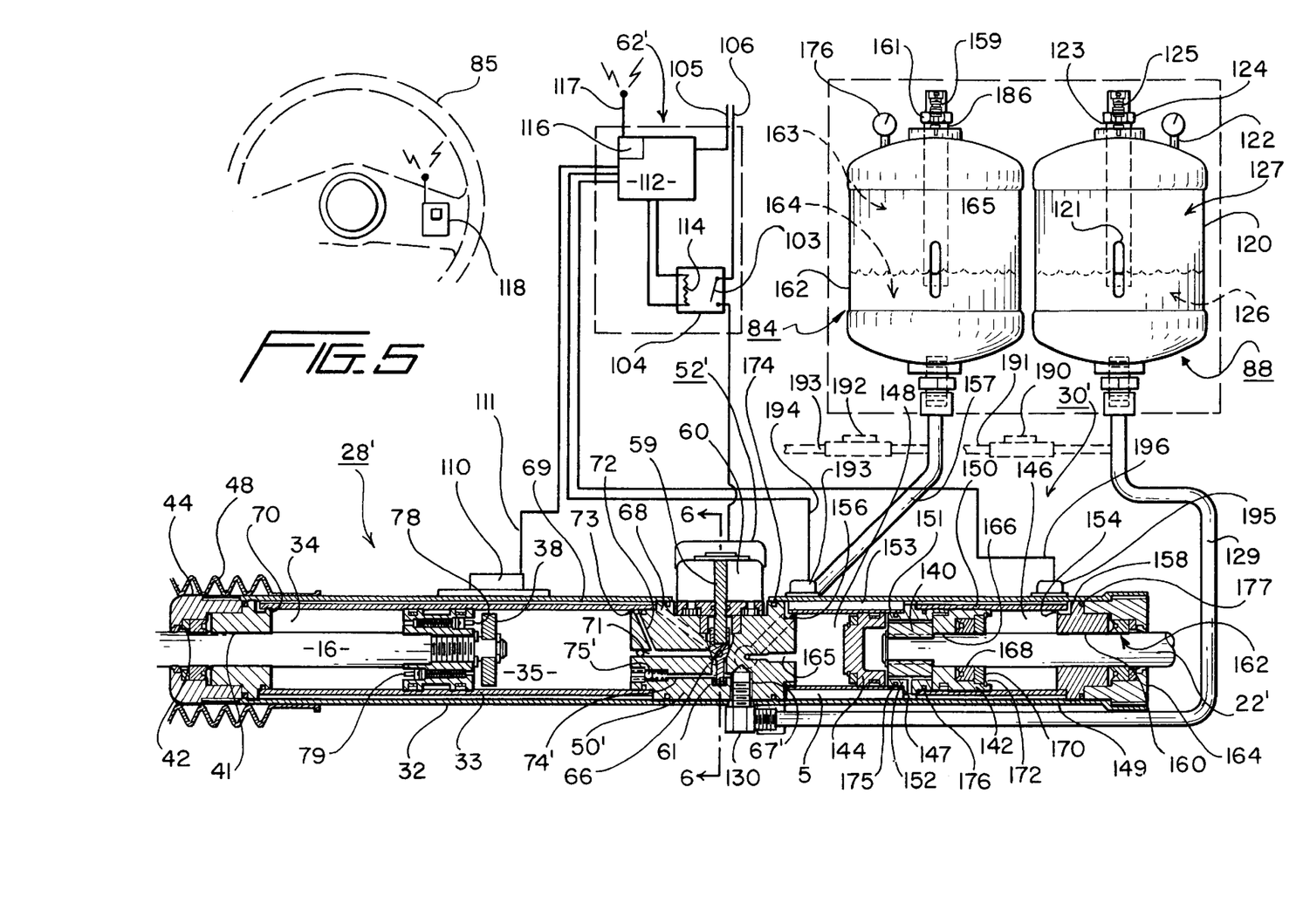
FIG. 5 is a schematic diagram of the fluid and electrical systems and of the major components of a modification of the invention, and includes sectional views showing structural details of the holding cylinder assembly and the turning resistance assembly.

Referring now to FIGS. 5 and 6, there is shown a modification 30' of the resistance assembly wherein a cylinder and dual piston arrangement is substituted for the spring arrangement of FIG. 3. A resistance cylinder housing 149 encloses two separate interior cylinders 150 and 151, the adjacent ends of which are connected together by a collar 152. The cylinders 150 and 151 contain resistance pistons 142 and 144, respectively, and these components together define respective fluid chambers 146 and 148. An enlarged rod head 140 is keyed and fastened to the inner end of a resistance rod 22'. Head 140 is positioned between opposing faces of pistons 142 and 144 and serves as the actuator for these pistons.

A breather port 147 is provided in collar 152 to allow air to enter and leave the space between pistons 142 and 144 as they reciprocate in cylinders 150 and 151. Port 147 vents to an annular space S between the exterior of cylinders 150 and 151 and the interior of housing 149. In turn, the annular space S may vent to ambient via a breather line or to a vent reservoir (not shown). The end portion of resistance rod 22' projecting beyond cylinder housing 149 is connected to the mounting bracket 24 by a conventional ball joint (not shown), and also may be surrounded by a dirt and grease barrier in the form of a flexible bellows (not shown) similar to that shown for holding rod 16 in FIG. 1.

The end of cylinder 150 opposite to collar 152 is closed by a head 158 having a journaled and sealed aperture 160 for sliding passage of resistance rod 22'. A set of multiple seals 162 and the head 158 are secured in place by an end cap 164 threaded or crimped into the cylinder housing 149. Piston 142 has a sealed aperture 166 for sliding passage of rod 22' during its movement of piston 144. A piston rod seal 168 and a journal 170 are secured in piston 142 by a snap ring 172. The end of cylinder 151 opposite to collar 152 is closed by one end of the valve body 50' and the two cylinders 150 and 151 are secured to the collar 152 and the opposite respective closures by crimping at positions beyond seal rings 174, 175, 176 and 177. Pistons 142 and 144 are shown in their rest positions corresponding to a centered steering system. These positions are offset toward the valve body 50' (to the left in FIG. 5) in order to equalize the volumetric capacity of chambers 146 and 148 since chamber 146 also contains a portion of rod 22'. Both pistons are arranged for compressive movement toward the opposite ends of their respective chambers, piston 142 traveling in chamber 146 and piston 144 traveling in chamber 148 within cylinders 150 and 151, respectively.

The rest or retracted position of each piston is defined by the internal annular collar 152 which serves as a piston stop and preferably has an axial width substantially (preferably within one-ten thousandth of an inch) equal to the axial thickness of rod head 140. A stop width greater than the head thickness is undesirable because gaps between opposing surfaces would allow unbiased movement (slack) between rod 22' and cylinders 150 and 151. A stop width less than the head thickness is also undesirable because this would let fluid flow back and forth between chambers 146 and 148 through a connecting conduit 153 so that the pistons 142 and 144 would move (drift) together until one of them bottoms out against the collar 152, there being no pressure differential applied to the rod head during such joint piston movement.

A fluid pressurization system 84 constantly biases the resistance pistons 142 and 144 into substantially simultaneous engagement with both the stop collar 152 and the piston rod head 140 at all times when the assembly is pressurized and in its center position, such that there is no significant slack or drift at any time during its operation. Near the end of each centering chamber opposite to the retracted piston position is a port for communicating fluid pressure to the chamber, port 154 serving chamber 146 and port 156 serving chamber 148. Ports 154 and 156 are connected together by the annular conduit 153 so that both ports communicate with chamber 148, which in turn is connected via a conduit 157 to an accumulator 162, which preferably provides hydraulic fluid under pressure to the centering chambers 146 and 148.

The vehicle steering system is properly centered when pistons 142 and 144 abut collar 152. In order to move or break away from collar 152, these pistons must overcome the resistance provided by accumulator pressure acting through the conduit 157, which may contain an in-line filter (not shown). An important feature of the fluid resistance unit 30' is the difference in diameters between cylinders 150 and 151, the diameter of cylinder 150 being larger by an amount sufficient to produce equal resistance forces on pistons 142 and 144 in spite of the area of piston 142 lost because the resistance rod 22' passes therethrough. Thus, to provide equal working areas, the cross-sectional area of cylinder 150 is greater than the cross-sectional area of cylinder 151 by an amount sufficient for the annular surface area of piston 142 to be equal to the disk surface area of piston 144, the difference in the cylinder cross-sectional areas being equal to the amount of piston area lost by reason of rod aperture 166 in piston 142.

The accumulator 162 has a gas chamber 163 over a liquid chamber 164, both chambers being pressurizable to a selected pressure by a one-way valve gas 159, such as a Schraeder valve, in a cap 161 closing a liquid fill tube 186. Although a gas such as air could also be used for the resistance fluid in chambers 146 and 148, a liquid resistance fluid is preferred because it is substantially incompressible as compared to a gaseous fluid, and therefore provides the capability of a viscous dampening action as the liquid flows through a restricted passage, such as that provided by an orifice 165.

The liquid chamber 164 of accumulator 162 should be large enough to receive the entire volume of fluid from either chamber 146 or 148 without unduly compressing the gas in chamber 163. The fill tube 186, which is normally closed by cap 161 carrying valve 159, allows liquid chamber 164 to be filled with hydraulic fluid up to the desired level as determined by a sightglass 165.

Gas pressure in chamber 163 acts against the liquid surface to store fluid energy received from the hydraulic side of the system, and to maintain fluid pressure on the liquid side of the respective pistons 142 and 144 until such time as the gas pressure is released to ambient atmosphere by actuation of Schraeder valve 159, which may be actuated to release air in the same manner as a vehicle tire valve. A pressure relief valve (not shown) may communicate with the gas chamber side of the accumulator to provide an upper limit to the resistance and return forces that may be generated by compressive contact of the piston rod head with one or the other of the resistance pistons.

Accumulator 162 also allows hydraulic pressure in the centering chambers 146 and 148 to be precisely set at a selected value within a relatively wide range corresponding to the gas pressures available. The gas trapped in gas chamber 163 provides a spring-like resistance force and this chamber may be sized such that the gas pressure and corresponding resistance force do not vary significantly with compressive piston movement. The gas pressure in chamber 163 is preferably in the range of about 200 to about 400 psig, and more preferably about 250 to about 300 psig. The gas pressure control may comprise the Schraeder valve 159 in combination with pressure gauge 176 to indicate accumulator pressure.

Alternately, a pressure regulator (not shown) may be used for maintaining a manually selected gas pressure in accumulator 162 where the vehicle has an air system, such as for air brakes. The regulator may be provided with a control knob to permit varying the pressure settings of the regulator by hand. By varying the gas pressure in gas chamber 163 through adjusting the pressure, the break away resistance and the centering return force produced by the pistons can be increased or decreased as desired. The range of pressures available should be selected so that break away resistance remains relatively high since the system is preferably used for centering at highway speeds.

For lighter vehicles, such as automobiles and pickup trucks, the accumulator pressure and other compensator parameters may be chosen so that a linear break away steering force of at least about 30 pounds, preferably at least about 50 pounds, more preferably at least about 100 pounds, and most preferably at least about 150 pounds, must be applied to the tie rod by the pitman arm in order to initiate a break away turning movement of the steerable wheels. For heavier vehicles, such as eighteen wheel trucks and motor homes, these parameters may be chosen to require a linear break away steering force of at least about 200 pounds, preferably at least about 225 pounds, and more preferably at least about 250 pounds. These turning forces are opposed by equal turning resistances which should be maintained for at least small turning angles away from center, preferably 0°–5°, more preferably 0°–3°, and most preferably within one degree on either side of center. Small turning angles correspond to large radius turning maneuvers.

When piston 144 reaches the end of its travel in chamber 148, this position is detected by a sensor 193 that sends a signal to control unit 62' via a wire 194. When piston 142 reaches the end of its travel in chamber 146, this position is detected by a sensor 195 that sends a signal via a wire 196 to control unit 62', which operates in the same way as control unit 62 of FIG. 2, except that two signal wires are used instead of one signal wire to signal the maximum permitted degree of turn to either side of center before deactivation and opening of valve 52 to permit free movement of piston 36 in cylinder 33.

In the embodiment of FIG. 5, the reservoir cylinder and its internal components have been replaced by a second pressure system 85 having a separate accumulator 120 that is essentially the same as accumulator 162 previously described. Pressure system 85 also includes a sight glass 121, a pressure gauge 122, and a liquid fill tube 123 closed by a fill cap 124 carrying a Schraeder type air valve 125. Removal of the cap 124 allows filling of the lower section 126 of the accumulator with a liquid, and Schraeder valve 125 allows filling the upper section 127 with a gas, such as air, preferably at a pressure in the range of about 20 to about 40 psig, more preferably about 30 psig.

The liquid under pressure in accumulator 120 is provided to the holding chambers 34 and 35 via a line 129 connected to a passageway 67' in the intermediate head 50' by a fitting 130. The remaining passageways in the head 50' are essentially the same as in the intermediate head 50 of FIG. 3, except the relief valve passages 74' and 76' are side by side instead of one over the other, and passage 65 is closed by plug 195 instead of valve 64 (FIG. 4), as seen best in FIG. 6. The remaining passages and elements are the same and have the same numerical designations as in FIG. 3. As the solenoid valve 52', the control unit 62', and the holding assembly 28' also are essentially the same as in FIG. 3, the same numerical designations are used for the parts of these components in FIGS. 5 and 6.

Persons skilled in the art, upon learning of the present disclosure, will recognize that various modifications to the units, and to the components and the elements of the units, of the invention are possible without significantly affecting their functions. For example, a gas such as air may be used as the fluid in both the holding assembly and the resistance assembly of FIG. 5. Also, other steering resistance units may be substituted for the resistance units 30 and 30' of the present invention. In this context, the term "resistance unit" means any unit capable of applying a resistance force to the steering system that tends to return it to a centered position for straight-ahead travel of a steerable member.

Similarly, other pressurizing units utilizing the same or other fluids may be substituted for the hydraulic accumulator 120 and/or 162. One such alternative is to replace these accumulators with pressure regulators 190 and 192 in gas supply lines 191 and 193 that are respectively connected to resistance unit supply lines 129 and 157, as shown by broken lines in FIG. 5. In this alternative, a pressurized gas instead of a pressurized liquid is used as the working fluid in both the holding assembly 28' and the resistance assembly 30'. Accordingly, while the preferred embodiments have been shown and described in detail by way of example, further modifications and embodiments are possible without departing from the scope of the invention as defined by the claims set forth below.

What is claimed is:

1. An apparatus for holding at a center position at least one steerable member mounted on a frame means for movement to either side of the center position, said apparatus comprising linkage means of variable length extending between said steerable member and said frame means, the length of said linkage means defining said center position and said linkage means comprising resistance means for providing a resistance force resisting steering forces tending to move said steerable member to either side of the center position, and center holding means for transmitting said steering forces to said resistance means, said holding means comprising:

a holding piston;

holding cylinder means for providing first and second holding chambers one on each side of said holding piston;

fluid transfer means for providing a flow of fluid to and from each of said holding chambers;

valve means remotely operable between a closed position for preventing said fluid flow from each of said holding chambers so that said holding piston is held in a locked position, and an open position for allowing said holding piston to move away from said locked position in said holding cylinder, said holding piston movement causing said fluid flow to one of said holding chambers and said fluid flow from the other of said holding chambers and permitting said steerable member to move to either side of said center position by changing the length of said linkage means in response to said steering forces; and, control means responsive to said resistance force for remotely operating said valve means so as to prevent said holding piston movement away from said locked position until said resistance force reaches a predetermined amount, said control means comprising:
 a first sensor means for providing a first signal in response to a predetermined amount of said resistance force,
 a second sensor means for providing a second signal in response to said holding piston being in said locked position,
 and switch means for actuating said valve means to said open position in response to said first signal and keeping said valve means open during said piston movement, and for actuating said valve means to said closed position in response to said second signal upon return of said holding piston to said locked position.

2. An apparatus according to claim 1 further comprising signal means activatable at a remote location for providing a third signal to said control means, and wherein operation of said valve means to its closed position is prevented until said third signal is provided to said control means.

3. An apparatus according to claim 1, wherein said fluid is a liquid, and said fluid transfer means comprises:
 a source of said liquid,
 and conduit means for providing liquid flow between said holding chambers and said source when said valve means is in its open position.

4. An apparatus according to claim 3 wherein said liquid source comprises:
 accumulator means comprising a reservoir for holding a supply of said liquid, and a gas chamber for pressurizing the liquid held in said reservoir;
 an outlet for providing fluid communication between said liquid reservoir and said conduit means; and,
 means for pressurizing said gas chamber with a gas to pressurize the liquid in said reservoir, said pressurizing means permitting the pressure of said gas to be varied so as to vary said liquid pressure.

5. An apparatus according to claim 4, wherein said gas chamber comprises a compressable plastic body made from plastic foam having closed cells.

6. An apparatus according to claim 4, wherein said accumulator means further comprises a fill tube for filling said reservoir with the liquid, and wherein said fill tube cooperates with a housing wall to define said reservoir below a discharge end of said fill tube and to define said gas chamber above the discharge end of said fill tube, such that gas supplied to said fill tube after said reservoir is filled with liquid passes through said liquid and into said gas chamber upon leaving the discharge end of said fill tube.

7. An apparatus according to claim 1, wherein said resistance means comprises:
 a resistance rod extending axially from one end of said holding cylinder means;
 a sleeve slidable along said resistance rod and carried on an intermediate portion thereof;
 joint means for connecting said sleeve to said steerable member or said frame means;
 a first compression spring means positioned between said sleeve and said one end of the holding cylinder means for providing said resistance force when said sleeve means tends to move toward said one end;
 a second compression spring means positioned between said sleeve means and a stop member on a distal end portion of said resistance rod to provide said resistance force when said sleeve means tends to move toward said stop member; and
 a trigger member movable with said sleeve means away from a neutral position in response to said predetermined amount of resistance force, said first sensor means being arranged to detect said trigger member movement and provide said first signal in response thereto.

8. An apparatus according to claim 1 wherein said resistance means comprises:
 resistance cylinder means providing a portion of said linkage means;
 a first piston cooperating with said resistance cylinder means to define a first resistance chamber;
 a second piston cooperating with said resistance cylinder means to define a second resistance chamber, each of said first and second pistons being arranged to move independently of the other between a retracted position and a position for compressing a fluid within its corresponding chamber;
 resistance rod means for providing another portion of said linkage means and comprising a rod head arranged for movement to either side of a neutral position corresponding to said center position, and an elongated rod for causing said rod head to engage each of said pistons independently of the other so that movement of said rod head away from said neutral position to one side causes compressive movement of said first piston without moving said second piston and movement of said rod head away from said neutral position to the other side causes compressive movement of said second piston without moving said first piston;
 connecting means for connecting said resistance rod means or said resistance cylinder means to said steerable member for movement therewith; and,
 resistance fluid means for providing a pressurized fluid in each of said first and second resistance chambers so that fluid pressure provides said resistance force by causing said pistons to bias said rod head toward said neutral position, and said bias opposes movement of said steerable member toward either side of said center position.

9. An apparatus according to claim 8 wherein said fluid is a liquid and said resistance fluid means includes a source of said liquid and conduit means for providing a flow of said liquid between said resistance chambers and between said resistance chambers and said source, said liquid source comprising:
 accumulator means comprising a reservoir for holding a supply of said liquid, and a gas chamber for pressurizing the liquid held in said reservoir;
 an outlet for providing fluid communication between said liquid reservoir and said conduit means; and, means for pressurizing said gas chamber with a gas to pressurize the liquid in said reservoir, said pressurizing means permitting the pressure of said gas to be varied so as to vary said liquid pressure.

10. An apparatus according to claim 9, wherein said accumulator means further comprises a fill tube for filling said reservoir with the liquid, and wherein said fill tube cooperates with a housing wall to define said reservoir below a discharge end of said fill tube and to define said gas chamber above the discharge end of said fill tube, such that gas supplied to said fill tube after said reservoir is filled with liquid passes through said liquid and into said gas chamber upon leaving the discharge end of said fill tube.

* * * * *